INVENTOR.
WILLIAM H. DEBOLT
BY
Jwesley Everett
ATTORNEY

INVENTOR.
WILLIAM H. DEBOLT
BY

ATTORNEY

INVENTOR.
WILLIAM H. DEBOLT
BY
ATTORNEY

Chart #1
Percentile Scores of Test Groups

| | 9th Grade | | | | 10th, 11th and 12th Grade | | | | |
|---|---|---|---|---|---|---|---|---|---|
| | Panel | | | | Panel | | | | |
| | 1 | 2 | 3 | 4 & 5 | 1 | 2 | 3 | 4 & 5 | |
| o/ile | Score | | | | Score | | | | o/ile |
| 99+ | 31 | 25 | 70 | 9.8 | 26 | 25 | 50 | 9.9 | 99+ |
| 95 | 45 | 33 | 82 | 9.2 | 37 | 34 | 75 | 9.3 | 95 |
| 90 | 48 | 36 | 98 | 8.3 | 40 | 39 | 81 | 8.8 | 90 |
| 85 | 51 | 40 | 100 | 7.4 | 45 | 42 | 86 | 8.4 | 85 |
| 80 | 53 | 46 | 107 | 7.1 | 47 | 45 | 89 | 8.0 | 80 |
| 75 | 56 | 48 | 110 | 6.9 | 51 | 48 | 92 | 7.7 | 75 |
| 70 | 57 | 55 | 118 | 6.7 | 53 | 50 | 97 | 7.4 | 70 |
| 65 | 58 | 56 | 122 | 6.4 | 63 | 56 | 103 | 7.0 | 65 |
| 60 | 59 | 57 | 127 | 6.2 | 61 | 59 | 112 | 6.6 | 60 |
| 55 | 60 | 58 | 132 | 6.1 | 62 | 61 | 118 | 6.4 | 55 |
| 50 | 63 | 59 | 142 | 5.9 | 64 | 63 | 133 | 6.3 | 50 |
| 45 | 64 | 61 | 152 | 5.6 | 67 | 66 | 137 | 5.9 | 45 |
| 40 | 68 | 67 | 160 | 5.4 | 68 | 72 | 140 | 5.7 | 40 |
| 35 | 70 | 69 | 164 | 5.3 | 70 | 81 | 153 | 5.4 | 35 |
| 30 | 73 | 72 | 167 | 5.0 | 74 | 85 | 170 | 5.1 | 30 |
| 25 | 76 | 75 | 175 | 4.8 | 80 | 86 | 185 | 4.9 | 25 |
| 20 | 81 | 78 | 183 | 4.7 | 83 | 89 | 210 | 4.6 | 20 |
| 15 | 93 | 77 | 200 | 4.5 | 87 | 96 | 220 | 4.2 | 15 |
| 10 | 111 | 93 | 216 | 4.3 | 90 | 103 | 253 | 3.8 | 10 |
| 5 | 136+ | 105 | 275 | 3.7 | 111 | 111 | 275 | 3.3 | 5 |
| 0 | 147 | 136 | 300 | 3.6 | 136 | 126 | 280 | 3.2 | 0 |

FIG. 6

INVENTOR
WILLIAM H. DEBOLT
BY [signature]
ATTORNEY

Chart #2
Minimum Percentile Scores for
Specific Trades and Occupations

| Occupation | 1 | 2 | 3* | 4 & 5 |
|---|---|---|---|---|
| Assembler (Small Parts) | 45 | 45 | - | - |
| Auto Mechanic | 45 | 40 | - | 55 |
| Carpentry (Cabinet) | 35 | 35 | - | 50 |
| Carpentry (Constr.) | 35 | 35 | - | 40 |
| Draftsman | 40 | 40 | - | 60 |
| Electrician | 35 | 35 | - | 40 |
| Electronics Technician | 45 | 45 | 35 | 50 |
| Machine Operator | 50 | 50 | - | - |
| Machinist | 50 | 50 | 20 | 50 |
| Sewing Machine Operator | 40 | 40 | - | - |
| Tool and Die Maker | 50 | 50 | 25 | 60 |
| Trowel (Bricklayer) | 35 | 35 | - | 40 |
| Typist | 50 | 50 | - | - |

*Score on Panel #3 is not necessary for use in screening where score is deleted. However, if the individual has scored on this panel in a diagnostic situation careful consideration should be given to insure that this person is aware of the other trades for which he qualifies.

FIG. 7

INVENTOR

WILLIAM H. DEBOLT

BY [signature]

ATTORNEY

CONVERSION CHART III
for
Panel #4 & 5

Number of Attempts

| Equivalent Scores | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| Positive Score 30 | | | | | | | | | | | | | | | | | | | | | | | | | | | | | | 2030 |
| 29 | | | | | | | | | | | | | | | | | | | | | | | | | | | | | 1740 | |
| 28 | | | | | | | | | | | | | | | | | | | | | | | | | | | | 1652 | | 1970 |
| 27 | | | | | | | | | | | | | | | | | | | | | | | | | | | 1566 | | 1682 | |
| 26 | | | | | | | | | | | | | | | | | | | | | | | | | | 1482 | | 1596 | | 1910 |
| 25 | | | | | | | | | | | | | | | | | | | | | | | | | 1400 | | 1512 | | 1624 | |
| 24 | | | | | | | | | | | | | | | | | | | | | | | | 1320 | | 1430 | | 1540 | | 1850 |
| 23 | | | | | | | | | | | | | | | | | | | | | | | 1242 | | 1350 | | 1458 | | 1566 | |
| 22 | | | | | | | | | | | | | | | | | | | | | | 1166 | | 1272 | | 1378 | | 1484 | | 1790 |
| 21 | | | | | | | | | | | | | | | | | | | | | 1192 | | 1196 | | 1300 | | 1404 | | 1508 | |
| 20 | | | | | | | | | | | | | | | | | | | | 1020 | | 1122 | | 1224 | | 1326 | | 1428 | | 1730 |
| 19 | | | | | | | | | | | | | | | | | | | 950 | | 1150 | | 1150 | | 1250 | | 1350 | | 1450 | |
| 18 | | | | | | | | | | | | | | | | | | 882 | | 980 | | 1078 | | 1176 | | 1274 | | 1372 | | 1670 |
| 17 | | | | | | | | | | | | | | | | | 816 | | 912 | | 1108 | | 1104 | | 1200 | | 1296 | | 1392 | |
| 16 | | | | | | | | | | | | | | | | 752 | | 846 | | 940 | | 1034 | | 1128 | | 1222 | | 1316 | | 1610 |
| 15 | | | | | | | | | | | | | | | 700 | | 782 | | 874 | | 1066 | | 1058 | | 1150 | | 1242 | | 1334 | |
| 14 | | | | | | | | | | | | | | 630 | | 720 | | 810 | | 900 | | 990 | | 1080 | | 1170 | | 1260 | | 1550 |
| 13 | | | | | | | | | | | | | 598 | | 670 | | 748 | | 836 | | 1024 | | 1012 | | 1100 | | 1188 | | 1276 | |
| 12 | | | | | | | | | | | | 516 | | 602 | | 688 | | 774 | | 860 | | 946 | | 1032 | | 1118 | | 1204 | | 1490 |
| 11 | | | | | | | | | | | 462 | | 572 | | 640 | | 714 | | 798 | | 982 | | 966 | | 1050 | | 1134 | | 1218 | |
| 10 | | | | | | | | | | 410 | | 492 | | 574 | | 656 | | 738 | | 820 | | 902 | | 984 | | 1066 | | 1148 | | 1430 |
| 9 | | | | | | | | | 360 | | 440 | | 546 | | 610 | | 680 | | 760 | | 940 | | 920 | | 1000 | | 1080 | | 1160 | |
| 8 | | | | | | | | 322 | | 390 | | 468 | | 546 | | 624 | | 702 | | 780 | | 858 | | 936 | | 1014 | | 1092 | | 1370 |
| 7 | | | | | | | 266 | | 342 | | 418 | | 520 | | 580 | | 646 | | 722 | | 898 | | 874 | | 950 | | 1026 | | 1102 | |
| 6 | | | | | | 222 | | 306 | | 370 | | 444 | | 518 | | 592 | | 666 | | 740 | | 814 | | 888 | | 962 | | 1036 | | 1310 |
| 5 | | | | | 180 | | 252 | | 324 | | 396 | | 494 | | 550 | | 612 | | 684 | | 856 | | 828 | | 900 | | 972 | | 1044 | |
| 4 | | | | 140 | | 210 | | 290 | | 320 | | 420 | | 490 | | 560 | | 630 | | 700 | | 770 | | 840 | | 910 | | 980 | | 1250 |
| 3 | | | 102 | | 170 | | 238 | | 316 | | 374 | | 468 | | 520 | | 578 | | 646 | | 814 | | 782 | | 850 | | 918 | | 986 | |
| 2 | | 66 | | 132 | | 198 | | 264 | | 330 | | 396 | | 462 | | 528 | | 594 | | 660 | | 726 | | 792 | | 858 | | 924 | | 1190 |
| 1 | 32 | | 96 | | 160 | | 224 | | 288 | | 352 | | 442 | | 480 | | 544 | | 608 | | 772 | | 736 | | 800 | | 864 | | 928 | |
| 0 | | 62 | | 124 | | 186 | | 248 | | 310 | | 372 | | 434 | | 496 | | 558 | | 620 | | 682 | | 744 | | 806 | | 868 | | 1130 |
| Negative 1 | 30 | | 90 | | 150 | | 210 | | 270 | | 330 | | 416 | | 450 | | 510 | | 570 | | 730 | | 690 | | 750 | | 810 | | 870 | |
| 2 | | 58 | | 115 | | 174 | | 232 | | 290 | | 348 | | 406 | | 464 | | 522 | | 580 | | 638 | | 696 | | 754 | | 812 | | 870 |
| 3 | | | 84 | | 140 | | 196 | | 252 | | 308 | | 390 | | 420 | | 476 | | 532 | | 688 | | 644 | | 700 | | 756 | | 812 | |
| 4 | | | | 108 | | 162 | | 216 | | 270 | | 324 | | 378 | | 432 | | 486 | | 540 | | 594 | | 648 | | 702 | | 756 | | 810 |
| 5 | | | | | 130 | | 182 | | 234 | | 286 | | 364 | | 390 | | 442 | | 494 | | 646 | | 598 | | 650 | | 702 | | 754 | |
| 6 | | | | | | 150 | | 200 | | 250 | | 300 | | 350 | | 400 | | 450 | | 500 | | 550 | | 600 | | 650 | | 700 | | 750 |
| 7 | | | | | | | 168 | | 216 | | 264 | | 338 | | 360 | | 408 | | 456 | | 504 | | 552 | | 600 | | 648 | | 696 | |
| 8 | | | | | | | | 184 | | 230 | | 276 | | 322 | | 368 | | 414 | | 460 | | 506 | | 552 | | 598 | | 644 | | 690 |
| 9 | | | | | | | | | 198 | | 242 | | 286 | | 330 | | 374 | | 418 | | 462 | | 506 | | 550 | | 594 | | 638 | |
| 10 | | | | | | | | | | 210 | | 252 | | 294 | | 336 | | 378 | | 420 | | 462 | | 504 | | 546 | | 588 | | 630 |
| 11 | | | | | | | | | | | 220 | | 260 | | 300 | | 340 | | 380 | | 420 | | 460 | | 500 | | 540 | | 580 | |
| 12 | | | | | | | | | | | | 228 | | 266 | | 304 | | 342 | | 380 | | 418 | | 456 | | 494 | | 532 | | 570 |
| 13 | | | | | | | | | | | | | 234 | | 270 | | 306 | | 342 | | 378 | | 414 | | 450 | | 486 | | 522 | |
| 14 | | | | | | | | | | | | | | 238 | | 272 | | 306 | | 340 | | 374 | | 408 | | 442 | | 476 | | 510 |
| 15 | | | | | | | | | | | | | | | 240 | | 272 | | 304 | | 336 | | 368 | | 400 | | 432 | | 464 | |
| 16 | | | | | | | | | | | | | | | | 240 | | 270 | | 300 | | 330 | | 360 | | 390 | | 420 | | 450 |
| 17 | | | | | | | | | | | | | | | | | 238 | | 266 | | 294 | | 322 | | 350 | | 378 | | 406 | |
| 18 | | | | | | | | | | | | | | | | | | 234 | | 260 | | 286 | | 312 | | 338 | | 364 | | 390 |
| 19 | | | | | | | | | | | | | | | | | | | 228 | | 252 | | 276 | | 300 | | 324 | | 348 | |
| 20 | | | | | | | | | | | | | | | | | | | | 220 | | 242 | | 264 | | 286 | | 308 | | 330 |
| 21 | | | | | | | | | | | | | | | | | | | | | 210 | | 230 | | 250 | | 270 | | 290 | |
| 22 | | | | | | | | | | | | | | | | | | | | | | 198 | | 216 | | 234 | | 252 | | 270 |
| 23 | | | | | | | | | | | | | | | | | | | | | | | 184 | | 200 | | 216 | | 232 | |
| 24 | | | | | | | | | | | | | | | | | | | | | | | | 168 | | 182 | | 196 | | 210 |
| 25 | | | | | | | | | | | | | | | | | | | | | | | | | 150 | | 162 | | 174 | |
| 26 | | | | | | | | | | | | | | | | | | | | | | | | | | 130 | | 140 | | 150 |
| 27 | | | | | | | | | | | | | | | | | | | | | | | | | | | 108 | | 116 | |
| 28 | | | | | | | | | | | | | | | | | | | | | | | | | | | | 84 | | 90 |
| 29 | | | | | | | | | | | | | | | | | | | | | | | | | | | | | 58 | |
| 30 | | | | | | | | | | | | | | | | | | | | | | | | | | | | | | 30 |

2 3 4 5 6 7 8 9 10 11 12 13 14 15 16 17 18 19 20 21 22 23 24 25 26 27 28 29 30

Number of Attempts

FIG. 8

INVENTOR
WILLIAM H. DEBOLT
BY [signature]
ATTORNEY

United States Patent Office 3,427,731

Patented Feb. 18, 1969

3,427,731

EDUCATIONAL TESTING DEVICE

William H. Debolt, 255 Dill Ave., Frederick, Md. 21701

Filed Dec. 7, 1966, Ser. No. 599,793

U.S. Cl. 35—13 1 Claim

Int. Cl. G09b 25/02

ABSTRACT OF THE DISCLOSURE

A device for testing the manual dexterity of a person consisting of a base with a number of threaded elements mounted thereon, each of the latter having predetermined thread characteristics as to pitch and hand and a corresponding number of individual threaded elements having thread characteristics corresponding to the threaded elements on the base and adapted to be threadedly connected thereto.

This invention relates to an apparatus or means for use in testing the mechanical dexterity and coordination of a student and also in the method of applying the test using said apparatus.

In modern times, in the science of education, it has become common practice to determine by means of special tests the particular field of study a student should pursue in order to bring out his best talents and capabilities and thus insure his success not only while in school, but later in life when he has become one of the employed and must earn a living.

It is one object of this invention therefore to produce a device for use in conducting a test to determine the mechanical dexterity and coordination of a student such as may, for example, indicate whether he has the required ability to become a machinist or some similar technical specialist.

It is another object to devise a method of procedure using the device mentioned to apply the test and evaluate the results.

The above and other objects and advantages will become apparent as this description proceeds, reference being had to the accompanying drawings forming a part of this specification and in which;

FIGURES 6, 7 and 8 show charts which may be employed in administering tests using the various modifications of the invention shown in FIGURES 1 to 5 and evaluating the results.

Figures 1, 2, 3:
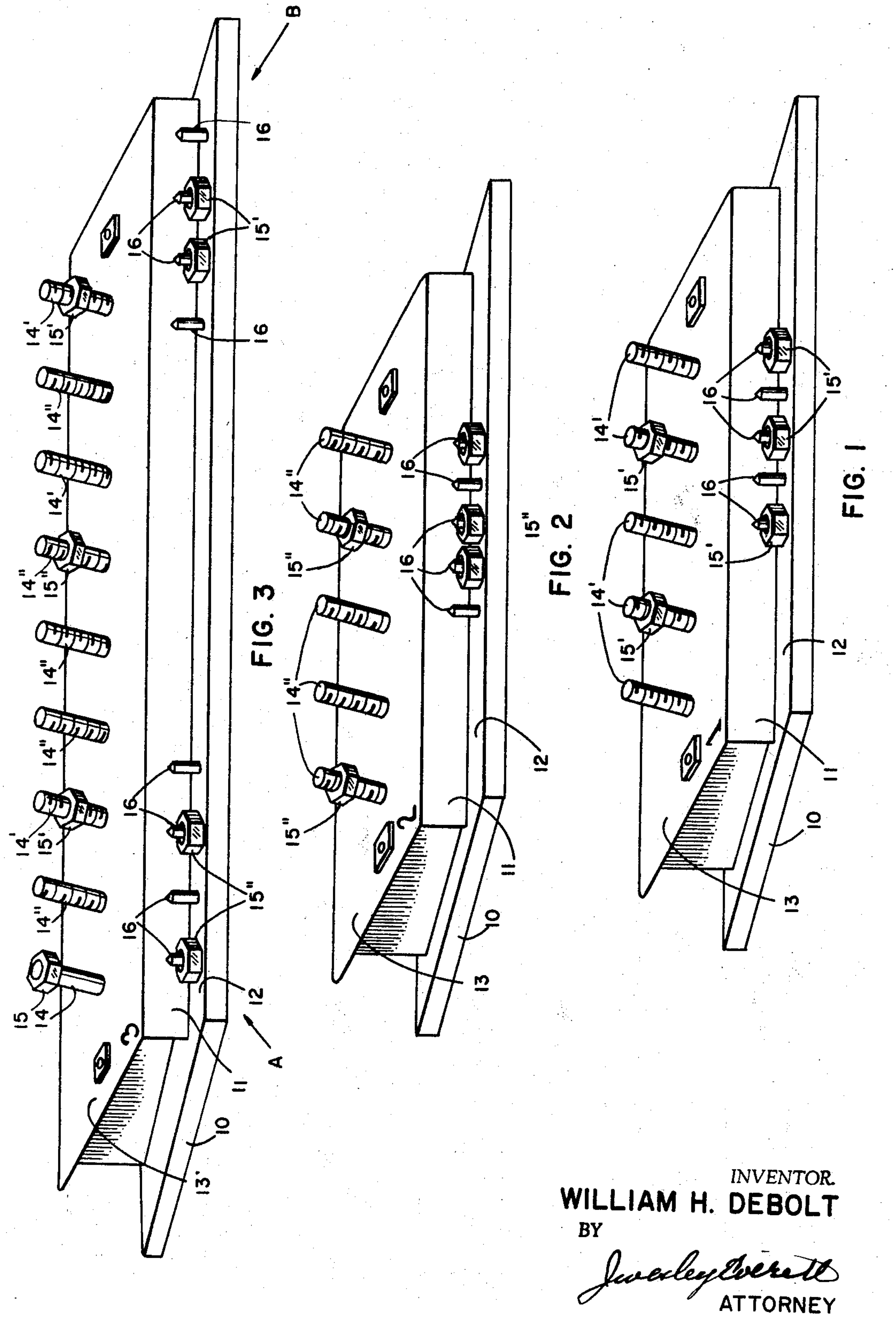
FIG. 1 is a perspective view of one form of my invention.
FIG. 2 is a perspective view of a slightly modified form of the invention.
FIG. 3 is a perspective view of a further modification.

Referring to FIGS. 1, 2 and 3, the device comprises a base member 10 having a blocklike member 11 of smaller longitudinal and transversal dimensions than the said base member, mounted thereon. The smaller dimensions of the blocklike member provides a shelflike ledge 12 on the base all around the blocklike member, the purpose of which will be later described. The top surface 13 of the blocklike member is inclined downwardly toward one longitudinal edge of the base as shown.

Mounted on the inclined top surface 13 and normal thereto are a plurality of threaded studs 14. These studs may vary in number and size but it has been found that the number of studs need not exceed nine nor should it be less than five to accomplish the desired results. In other respects however, these studs do vary in their thread characteristics in the different modifications. For example, in the modification of FIG. 1 the studs 14' are of the same size and all have right threads with matching nuts 15'. In FIG. 2 the studs are also of the same size with matching nuts, but all have left hand threads. The form shown in FIG. 3 shows a blank stud 14 with a fixed nut 15 and every other stud 14' is of the same size and provided with a right hand thread and a corresponding right hand threaded nut 15' adapted to be threadably receivable on the studs 14'. Likewise the studs 14'' are of the same size and are provided with left hand threads and matching nuts 15''.

A number of pegs 16 are provided on the shelflike ledge 12 to accommodate the nuts when not in use or before beginning the test which the device is designed to provide. In FIG. 3 the right and left hand nuts may be kept separately or at opposite ends A and B of the base 10.

The modification shown in FIG. 3 in effect combines those shown in FIGS. 1 and 2 and the number of threaded studs, nuts and pegs are accordingly increased and the length of the entire base and inclined block assembly is correspondingly lengthened. As all the parts are substantial duplicates of those shown in FIGS. 1 and 2 like reference numerals are employed.

Figure 4:
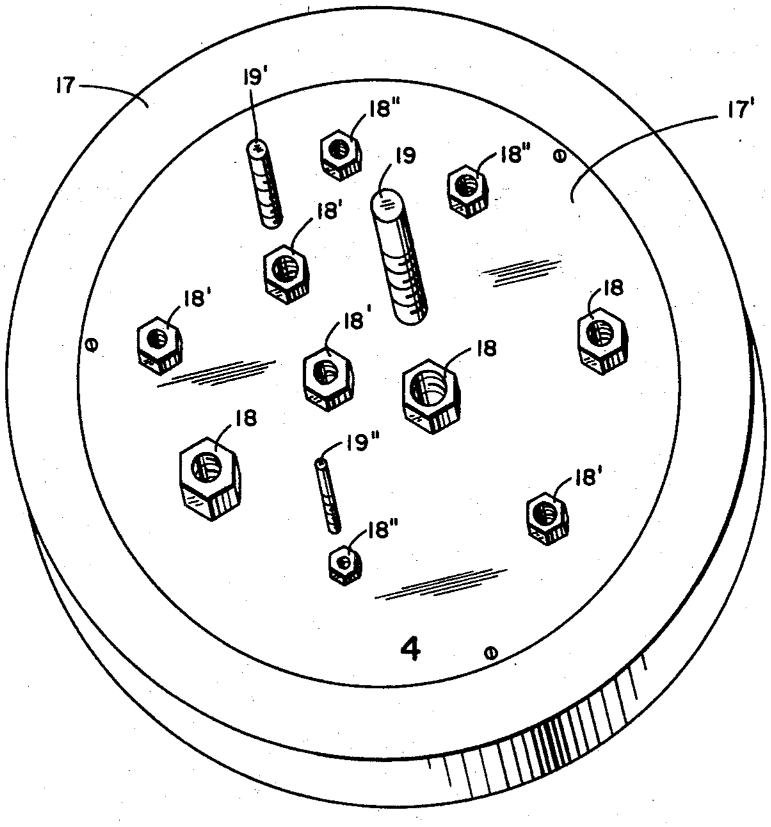
FIG. 4 is a perspective view of another modification.

In the modification shown in FIG. 4 the base 17 is made circular in shape and is provided with a flat horizontal top surface in which a plurality of threaded nuts are fixed to the upper surface 17' by welding, gluing or by any other suitable means. In this form of the device, the nuts are of different diameters and threads of different pitch, with corresponding studs to fit into the fixed nuts. For example, stud 19 is shown positioned above nut 18 and is threadably receivable therein. Stud 19' is positioned above nut 18' and is also adapted to be screwed into the nut 18'. Stud 19'' is positioned above nut 18'' and will screw into the nut 18''. It will be noted that throughout the surface of the base are three sizes of nuts and thread pitches, however, the invention is not limited to this particular number but may take various sizes and thread pitches.

The above described so called modifications of the device may be used individually or several or all of them may be employed as a set to determine mechanical dexterity of a student at various levels of vocational technical training.

As an example, at the lowest level the student may be provided with the form of device shown in FIG. 1 and asked to thread a nut on each of the studs in succession. The time taken to perform this operation is then taken with a stop watch and recorded for later evaluation.

A similar procedure may be followed using the device shown in FIG. 2 having the left hand threaded studs.

In using the device of FIG. 3 the student will be required to thread the right hand threaded nuts on the studs at the right of FIG. 3 with the right hand and at the same time thread the left hand threaded nuts on the studs at the left with the hand. The time required will also be recorded for this operation.

In using the modification of FIG. 4 the student will be required to first determine by visual observation what stud on the base each nut fits before trying to thread the same thereon. The number of correct choices and the time required are then recorded for evaluation.

Figure 5:
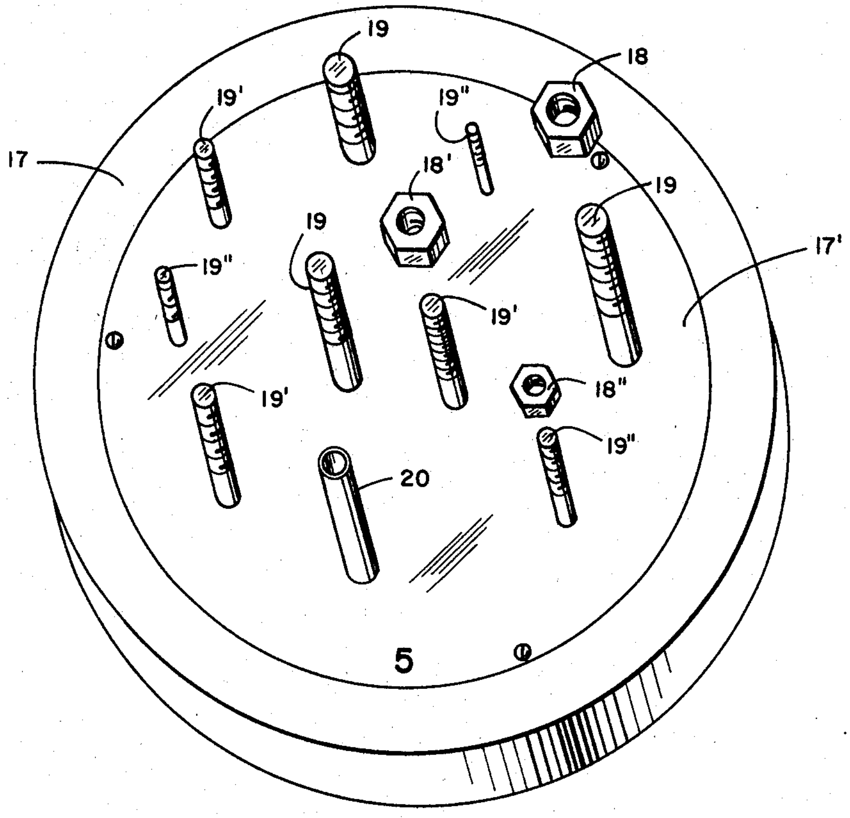
FIG. 5 is a perspective view of a still further modification.

FIG. 5 is the reverse of FIG. 4. Instead of the nuts being fixed to the surface of the base 17' the studs are secured to the base. It will be noted for illustration that the nuts 18, 18' and 18'' are positioned above the proper studs 19, 19' and 19'' ready to be threadably engaged therewith.

While the studs and nuts illustrated in FIGS. 4 and 5 are right hand threaded, they may be left hand threaded, or have some of one and some of the other thread.

The following sets out one method which may be employed to compute scores and determine the fitness of students for various occupations. In these instructions the panels referred to are the five modifications above described and the panel numbers correspond to the figure numbers in the drawings.

SCORE COMPUTATION AND APPLICATIONS

*Computing percentile score panels 1, 2 and 3*

To find the percentile scores of Panels 1, 2 or 3 use the following procedure:

(1) Round the time in seconds off to the nearest whole second.

(2) Refer to Chart #I (FIG. 6) selecting the column with the correct test or panel label at the top.

(3) Find the score that is the same in the columns as the number of seconds recorded on the test. In case the score falls between two scores given on Chart I, use the score on the chart nearest the time in seconds. For most situations this will be accurate enough for application.

(4) Once the score is located move horizontally to read the percentile on the left or right-hand side of Chart I.

(5) Record this information for future reference on the student or applicants' test record.

*Computing percentile score panels 4 and 5*

The raw scores obtained from administering Panels 4 and 5 require mathematical computations in order to derive a test score that is indicative of the objectives. To obtain this test score use the following procedure:

(1) Add the number of attempts (right plus wrong) in both Panels 4 and 5. This will give total attempts for both Panels 4 and 5.

*Total attempts equal right plus wrong selections*

(2) Subtract the number of wrong selections from the number of right selections (total right and total wrong selections both panels).

*Equivalent score equals right minus wrong selections*

(3) When subtracting wrong from right selections the result in some cases may be a negative number. This negative number does not necessarily indicate a poor test score. It must be used and applied as such.

(4) Using Chart III (FIG. 8) compute the test score by first locating the number of total attempts at the top or bottom of the chart. Then locate the equivalent score in the left-hand column—being careful to note whether this score is positive or negative. Once the total attempts and equivalent score are located move vertically from the attempts and horizontally from the equivalent score. At the point where the two lines cross on the chart read and record the number as listed.

(5) Once the number from Chart III is obtained point off two (2) places from the right and drop the first digit on the right. The remaining number is the test score.

(6) Using the derived test score (Panel 4 and 5) find the percentile score on Chart I as previously explained.

Record the percentile score on the student or applicants record.

*Use of percentile scores*

Once the percentile score for each panel or section of the test are obtained refer to Chart II (FIG. 7) in order to determine the minimum score for each panel in a specific application. These scores are indicative of one study and in different applications may vary with local situations.

Job and skill analysis for each have indicated that this level of percentiles in the test will provide those individuals who have the necessary levels to succeed in fields or skills named.

Additional predictive validity studies will add additional information and provide corrected norms in some cases.

Percentile scores are not listed in all levels for each occupation or skill. The omission in each case indicated that for the specific trade or skill the application of information from the specific panel or section deleted is not necessary as a determinate.

However, it must be remembered that when the test is used for determining a skill or occupation selection the entire test should be used. Each individual should be encouraged to fully utilize his potential.

Having thus described my invention what I claim and desire to secure by Letters Patent is:

1. A device for testing the mechanical dexterity of a student comprising:

(a) a flat base, (b) a member of smaller lateral dimensions than the base fixed centrally thereon and having a flat inclined upper surface, the smaller dimensioned member defining a flat marginal area on the base surrounding the member, (c) a plurality of threaded studs extending normally from the inclined upper surface of the member, certain of said studs having thread characteristics differing from other of said studs, (d) a plurality of threaded nuts corresponding in number and thread characteristics with the threaded studs whereby a nut may be threaded on each stud; and (e) a plurality of plain pegs on the flat marginal are of the base corresponding in number to the number of nuts and adapted to hold the same when not threaded on the threaded studs.

References Cited

UNITED STATES PATENTS

| | | | |
|---|---|---|---|
| 2,377,100 | 5/1945 | Patterson | 35—22 |
| 2,835,986 | 5/1958 | Roeder | 35—13 |
| 3,276,149 | 10/1966 | Barnabas | 35—22 |

EUGENE R. CAPOZIO, *Primary Examiner.*

H. S. SKOGQUIST, *Assistant Examiner.*

U.S. Cl. X.R.

116—136; 35—22